June 3, 1969

M. DIEVAL ET AL 3,448,269

METHOD AND APPARATUS FOR ANALYSING RADIOACTIVE AEROSOLS

Filed June 21, 1966

FIG. 1

United States Patent Office 3,448,269
Patented June 3, 1969

3,448,269
METHOD AND APPARATUS FOR ANALYSING RADIOACTIVE AEROSOLS
Michel Dieval, Antony, Jean Dupoux, Meudon, Henri Joffre, Bourg-la-Reine, and Jacques Pradel, Malakoff, France, assignors to Commissariat à l'Energie Atomique, Paris, France
Filed June 21, 1966, Ser. No. 559,129
Claims priority, application France, June 28, 1965, 22,494
Int. Cl. G01t 1/18
U.S. Cl. 250—83.6                                    13 Claims

ABSTRACT OF THE DISCLOSURE

The radioactivity of air is measured using a moving filter strip on which the aerosols are deposited. At a first measured activity threshold the exposure time of the filter strip is reduced by a known ratio. At a second measured activity threshold, the aerosol concentration of the air flowing through the filter is reduced by a known ratio and above a third measured activity threshold all of the aerosols are removed from the air before the air passes through the filter.

---

This invention relates to a method and apparatus for analysing radioactive aerosols.

In order to measure atmospheric contamination by radioactive aerosols it is conventional practice to produce an airflow through a filter paper strip driven with a uniform movement. The detector then measures the activity of the radioactive dust, hereinafter referred to as aerosols, deposited on the filter paper. This arrangement is generally known as a radioactive aerosol recorder.

Since the maximum admissible concentrations in the atmosphere are very low, a valid reading necessitates the filtration of a large volume of air to form a large deposit on the paper, the measured magnitude then being the mean value of the phenomenon under study.

With low concentrations, therefore, it is advantageous to have the longest possible exposure time for the filter paper, such time depending upon the speed of travel of the paper and the distance to be covered with respect to the sensitive surface of the detector. This condition is usually satisfied by selecting a very low speed of travel for the paper.

In the case of high concentrations, however, with a long exposure time for the paper, the recorder information corresponding to a large quantity of aerosols becomes difficult to interpret. In such cases the mean value of the phenomenon should no longer be studied; instead the instantaneous variations should be followed, and this has led to an increase in the recorder resolution time to the detriment of its sensitivity.

The present tendency is to keep the filter paper exposure time constant during the entire monitoring period. Of course the speed of travel of the filter paper can be modified by a change of gear in the gearing system driving the paper, but this entails a loss of some information, because such a change necessitates stopping the travel of the filter paper.

Finally, if an accident has produced a very high concentration, the sampling circuit remains highly contaminated and proper operation of the recorder is practically impossible, since the residual radioactivity of the circuit is usually much greater than the radioactivity of the atmosphere which resumes a normal value.

This invention relates to a method of analysing radioactive aerosols and to apparatus for the same to obviate the above disadvantages.

According to one aspect of the invention there is provided a method of analysing radioactive aerosols by the creation of an air flow through a filter strip driven with a uniform movement at a rate depending upon the activity of aerosols deposited on said strips, which method is characterised in that it comprises stagewise reduction of the measured proportion of the radioactivity of the air in known ratios.

According to a preferred embodiment of the method, above a first measured activity threshold the exposure time of the filter strip is reduced in a known ratio; above a second measured activity threshold the aerosol concentration of the analysed gas volume flowing through the filter is reduced in a known ratio; and above a third threshold all the aerosols are retained before arrival of the air at the filter.

According to another aspect of the invention there is provided an apparatus for the analysis of radioactive aerosols, said apparatus comprising a filter consisting of a filter strip moving uniformly past an aperture by means of a motor, means for providing a flow of air through said filter, and a detector for measuring the radioactive particles deposited on the said strip, said detector being connected to an electromechanical recorder, characterised in that it comprises a threshold circuit connected firstly to the detector and secondly to an element which from each of the thresholds respectively controls a system for changing the aerosol exposure time, a unit diluting with purified air a desired proportion of the aerosols contained in the collected air, and means for absolute filtration of the air before its arrival at the filter, said means being associated with a second detector connected to the threshold circuit.

According to one embodiment of the apparatus, the control element associated with the threshold circuit is connected to a system for changing the speed at which the filter is driven.

According to another embodiment, the apparatus includes a mask, between the filter and the detector, the mask being movable in parallel relationship to the filter between a position in which it completely frees the detector and provides maximum analysis, and a partial closure position in which the analysis time is reduced.

The invention will now be described by way of example with reference to the accompanying drawings in which:

FIGURE 1 is a diagram of the apparatus according to the invention.

Figure 2:
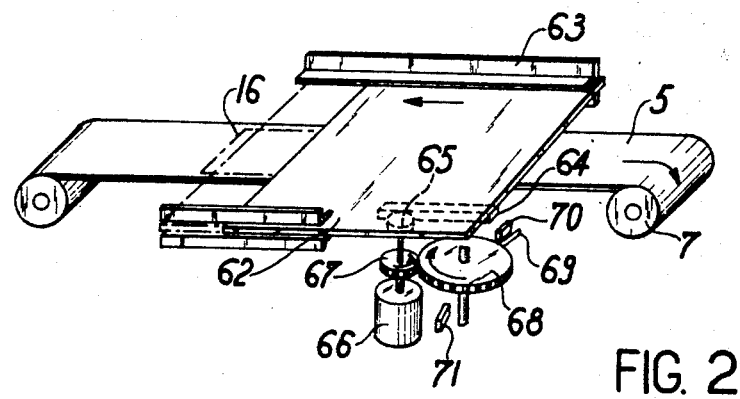
FIGURE 2 is a partial view of a first embodiment of the aerosol exposure time control system.

With reference to FIG. 1, the apparatus comprises a sampling unit 1 and a measuring unit 2. A dilution unit 3 and a gas monitoring unit 4 can be added.

In the sampling unit 1, a filter paper strip 5 is wound on a feed reel 6 and a take-up reel 7. The filter paper band 5 passes through a bed 8 consisting of a table 9 and an air distributing ring 10, both covered by lead shielding. A funnel 11 machined at the center of the table 9 continues in the form of a conduit 12 provided with a valve 13. The conduit 12 leads to a volumetric suction pump 14 provided with an air outlet 15. The funnel 11 is closed by a grid 16 disposed in the plane of the top of the table 9. The distributing ring 10 is formed with a circular central aperture containing a photomultiplier 17 provided with a mixed scintillator 18 sensitive to $\alpha$ and $\beta$ radiation. In this embodiment, the surface of the filter facing the scintillator 18 coincides with the surface of the grid 16 which is, for example, a square. A conduit 19 connects an air inlet 20, provided with a strainer 21, to the distributing ring 10. This conduit 19 has a flowmeter 22, a solenoid valve 23 and a valve 24.

The take-up spool 7 is driven by a motor 25, preferably a two speed motor, through an electromagnetic clutch (not shown). Of course two motors operating at different speeds could be used.

The photomultiplier 17 is associated with two preamplifiers 26 and 27 connected to an electromechanical two channel recorder 28 disposed in the measuring unit. The channels are used respectively for $\alpha$ and $\beta$ radiation measurement. Each channel comprises a discriminator and an integrator 29 and 31 for the $\alpha$ channel and 30 and 32 for the $\beta$ channel. The integrators 31 and 32 are connected to a three threshold circuit 33, the thresholds being respectively connected to three visual alarms 34 and to a control circuit 35.

The dilution unit 3 can be connected upstream of the sampling unit 1 through two conduits 36 and 37 which connect to two corresponding conduits 38 and 39 of the sampling unit. Conduit 36 corresponds to the input to the dilution unit and conduit 37 to its output, the latter being connected to the air distributing ring 10. The conduit 36 contains a solenoid valve 40 and at point 41 it divides into two conduits 42 and 43, the latter forming a branch leading to point 44 in conduit 37. Conduit 42 contains a diaphragm 45, a flowmeter 46, a solenoid valve 47 and a valve 48. Diaphragm 45 can be replaced by a volumetric pump. Conduit 43 contains two absolute filters 49 and 50, a valve 51 and a flowmeter 52. The upstream absolute filter 49 contains a detector 53 connected to discriminator 30 by a preamplifier 54.

The control circuit 35 is connected to motor 25 and to the solenoid valve 23 of the sampling unit 1 and to the solenoid valves 40 and 47 of the dilution unit 3. A very high voltage energy source 55 in the sampling unit 1 supplies the photomultiplier 17 and detector 53.

The gas monitoring unit 4 may be connected to the sampling unit 1 by means of two connectors 56 and 57 and two corresponding connectors 58, 59 in unit 1. The unit 4 then forms a branch circuit on the main conduit 12, being connected to points 60 and 61 thereof, on either side of valve 13.

The apparatus operates as follows: the air drawn by pump 14 enters via inlet 20 and strainer 21. The pressure and hence the flow of this air is controlled by valve 24 depending upon the information furnished by the flowmeter 22, and enters the distributing ring 10 and is applied to the filter paper surface in register with the grid 16. It then flows through the filter paper 5 and leaves on the latter a radioactive aerosol deposit which is immediately analysed by the photomultiplier 17 associated with the scintillator 18. The function of the grid 16 is to support the filter paper 5 and prevent its being torn by the negative pressure provided by the suction pump 14. The filter paper 5 receives a uniform movement by means of the motor 25 driving the take-up spool 7.

Depending upon their amplitude, the pulses delivered by the photomultiplier 17 are applied to one of the two channels of the recorder 28. Since these two channels operate in exactly the same way, just one of them will be described. For example, the pulses applied to the $\beta$ channel are amplified in the preamplifier 27 and then shaped and calibrated by the discriminator 30 and then transmitted to integrator 32. The voltage output of the latter is fed to the recorder 28, which records the received information on a strip of paper. It is also applied to the threshold circuit 33, but the latter remains inoperative for a long as the activity of the analyzed aerosols is below the first threshold which, for example, may be about $10^{-8}$ Ci/m.$^3$.

When the activity measured exceeds this value, the threshold circuit 33 sends an alarm signal to 34 and changes the position of the control circuit 35 which then changes the motor 25 over to its second speed. The filter paper feed is thus accelerated and changes, for example, from a speed of one millimetre per minute to a speed of 100 millimetres per minute. With this new speed it is possible to follow the concentration variations which have become predominating at this level of radioactivity. When the first speed is used, each filter paper surface of a length equal to one of the sides of the grid 16 and of a width of one millimetre in the direction of travel remains exposed for 50 minutes in the case of a square grid of 50 mm. side, while at the second speed the same surface remains exposed for 30 seconds. The resolution time of the apparatus is therefore greatly increased. However, when the aerosol radioactivity exceeds a value of about $10^{-6}$ Ci/m.$^3$, the accumulation of radioactive aerosols in the sampling circuit is likely to affect the proper operation of the apparatus. The reason for this is that if this level of radioactivity is maintained for a relatively long time the radioactive aerosol recorder is contaminated and subsequently will no longer be able to indicate the decrease of the phenomenon. The second threshold of the circuit 33 therefore corresponds to this value and when it is reached the circuit 33 gives a second alarm 34 and passes a second signal to the control circuit 35 which on this occasion (selection being made according to the voltage level of the signal in question), is applied to the dilution unit 3. This control circuit 35 then closes the solenoid valve 23 while it opens the solenoid valve 40. Air therefore necessarily passes via circuit 20, 19, 36 and the two conduits 42 and 43 before reaching the distributing ring 10. Diaphragm 45 allows the passage of only a given percentage, preferably 1/100, of the flow in the conduit 36, i.e. for example 1 litre per minute, and the remaining 99% passes through the conduit 43.

The radioactive aerosols borne by the air flowing through the conduit 43 are totally retained by the two absolute filters 49 and 50. A 100 percent dilution has thus been obtained of the activity for measurement without any change of the conditions of operation of the sampling and pumping unit and just the purified air returns to the conduit 19, and at point 44 it mixes with the aerosol laden air originating from conduit 42. The rates of flow are monitored by the flowmeter 46 and the valve 48 in the case of branch circuit 42 and flowmeter 52 and valve 51 in the case of branch circuit 43.

The dilution unit can be removed for replacement or decontamination.

In the case of a very high concentration, the activity measured by the detector 17 may reach a third threshold corresponding to about $10^{-4}$ or $10^{-3}$ Ci/m.$^3$; in that case the control circuit 35 closes the solenoid valve 47, thus ending the flow of unfiltered air through the conduit 42, all the air which enters inlet 20 passing through conduit 43 and being filtered by the filters 49 and 50. Detector 53 then measures the total activity above the filter 49, and the maximum deflection of the recorder may be equal to 3000 shocks per second and be obtained for a filter retained activity equivalent to a concentration of 1 Ci/m.$^3$ for one hour. This supplementary detection unit is known as the "$\beta$ catastrophe unit."

During this period the pump 14 remains operative, the apparatus being ready to operate under normal conditions as soon as the radioactivity has dropped.

This procedure has no disadvantage as regards contamination, because the air flows through two absolute filters in series. As the radioactivity decreases, the different states of operation are restored automatically or manually to avoid complicating the electronic circuit.

The unit 4, which is connected after closure of valve 13, monitors the air just discharged through the filter for the aerosols it contained, and provides, for example, an analysis of the radioactive gases contained in this air. The air is then discharged to the outlet 15 by the pump.

According to one embodiment shown in FIG. 2, the filter paper band 5 is driven by a single speed motor 25, the speed being equal, for example, to one millimetre per minute. A mask 62 is mounted slidably between angle-sections 63. This mask is interposed between the filter paper 5 and the air distributing ring 10 (not shown) at an equal distance between the filter paper and the scintillator 18, this distance being of the order of 2 mm. for example. A rack 64 is secured beneath the mask 62 in parallel relationship to and near the angle sections 63. A cylindrical pinion 65 rigidly connected to a reversible motor 66 engages with the rack 64. In this embodiment, the control circuit 35 (not shown) is no longer connected to the motor 25 driving the take-up spool 7 but to the motor 66 which drives the mask 62. A gear wheel 67 rigidly connected to the shaft of this motor meshes with a gear wheel 68 provided with a lug 69 moving between two stops 70 and 71. The step down ratio is such that the movement of the lug 69 corresponds to that of the mask 62. In FIG. 2, the solid lines show the mask 62 in a first position in which it is situated level with the grid 16, while the chain dotted lines show a second position in which the surface of the filter paper 5 facing the scintillator 18 is practically completely masked and therefore can no longer coincide with the total surface of the grid 16. By way of example, in the case of a square grid having a side of 50 mm., this new surface will be a rectangle the size of which is 5 mm. in the direction of travel of the filter paper 5 and 50 mm. at right angles to that direction. The presence time of the aerosols beneath the detector is reduced accordingly. The direction of travel of the mask 62 is opposed to that of the filter paper 5 so that the new surface facing the scintillator 18 is situated on the left hand part of the grid 16 so that it may correspond to the start of the aerosol deposition. In FIG. 2, the positions of the rack 64, cylindrical pinion 65 and lug 69 abutting the stop 70 are associated with the first position.

With this embodiment, when the first threshold has been reached, the threshold circuit 33 changes the position of the control circuit 35 which actuates the motor 66 and hence the cylindrical pinion 65. In the arrangement illustrated, the latter rotates in the counterclockwise direction and drives the rack 64 and the mask 62 to the left in the drawing. At the same time, gearwheel 67 rigidly secured to cylindrical pinion 65 drives the gear wheel 68. When lug 69, which abutted stop 70, reaches stop 71, control circuit 35 is broken and the cylindrical pinion 65 and the mask 62 are stopped. The sampling surface is then partially masked by the mask 62 as indicated hereinbefore. In this embodiment, with the speed of travel of the paper again being 1 mm. per minute, in the second position of the mask each surface of the filter paper of a length equal to one of the sides of the grid 16 and of a width of one millimetre in the direction of travel of the paper remains exposed for 5 minutes instead of 50 minutes in the first position. The resolution time of the apparatus has been multiplied by ten.

Figure 3:
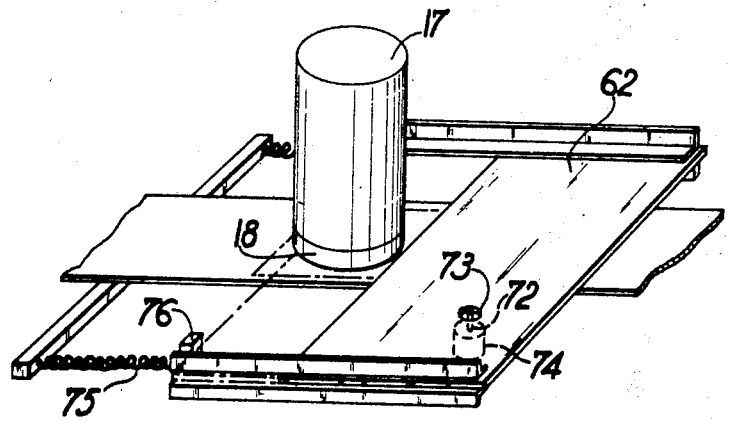
FIGURE 3 is a partial view of a second embodiment of this control system.

In another embodiment as shown in FIG. 3, the mask 62, for which the solid lines show the position in which the detector is free while the broken lines show the position for partial masking, is driven by a pin 72 engaging in an aperture 73 in the mask 62 and rigidly secured to an electromagnet 74. Two return springs 75 cooperating with two stops 76 enable the mask 62 to move to the second position as soon as the pin 72 is withdrawn from the aperture 73 by the electromagnet 74.

In normal operation, the mask 62 is therefore held by the pin 72 but when the first threshold has been reached the threshold circuit 33 changes the position of the control circuit 35 which disconnects the electromagnet 74. Pin 72 then no longer retains the mask 62 and under the action of the springs 75 the mask moves to stops 76. Scintillator 18 can no longer see the surface of the filter paper except when the paper passes into the space not covered by the mask 62.

As a result of the dilution unit, this apparatus not only has the advantage of greatly increasing the resolution of the radioactive aerosol recorder but also provides a considerable extension of its ranges of measurement. The addition of the catastrophe unit also increases its preformance.

We claim:

1. A method of analyzing radioactive aerosols in an air sample including passing the air through a filter strip driven with a uniform movement, continuously mesuring by means of a detector the activity of aerosols deposited on said strip including the step of analyzing all the radioactivity of the air sample when the detected radioactivity is below a first predetermined threshold, reducing in a predetermined ratio the time of exposure of the filter strip to the air when the degree of detected radioactivity is between said first threshold and a second threshold, reducing to a predetermined ratio the aerosol concentration of the analyzed air volume flowing through the filter when the degree of detected radioactivity is between said second threshold and a third threshold and removing all the aerosols from the air before arrival of the air at the filter when the degree of detected radioactivity is above said third threshold.

2. A method as described in claim 1 including the step of reducing the time of exposure of the filter strip by increasing the speed of movement of the filter strip.

3. A method as described in claim 1 including the step of reducing the time of exposure of the filter strip by reduction of the analysis surface of the filter strip.

4. A method as described in claim 1 including the steps of, dividing the sample into two parts when the degree of detected radioactivity is between said second and third thresholds and reducing the aerosol concentration in one of said parts by dilution with air free of aerosols from the other of said parts.

5. A method described in claim 4, the proportion of aerosol ladened air of said one part with respect to air free of aerosols of said other part being 1%.

6. Apparatus for the analysis of radioactivity aerosols comprising a filter strip, a motor for moving said filter strip past an aperture, means for providing a flow of air through said filter strip and said aperture, a first detector for measuring the radioactive particles deposited on said strip, an electromechanical recorder connected to said detector, a control circuit for changing the time of exposure of the filter strip to said detector, a unit for diluting with air free of aerosols a proporion of the aerosols contained in the flow of air, means for absolute filtration of the air before arrival at said filter strip, a second detector associated with said means for absolute filtration, a threshold circuit sensitive to the measured radioactivity connected to said first detector and to said control circuit for changing the time for exposure of said filter strip at a first threshold of measured radioactivity, for actuating said diluting unit at a second threshold and for actuating said means for absolute filtration at a third threshold, said second detector then measuring the total radioactivity of the flow of air.

7. Apparatus as described in claim 6, said control circuit connected to said threshold circuit changing the speed at which the filter is driven.

8. Apparatus as described in claim 6 including two conduits upstream of said filter strip controlled by a valve opening at the second threshold, one of said conduits having a flow control diaphragm and the other of said conduits having at least one absolute filter, the other of said conduits being connected to said one of said conduits for dilution of the aerosol ladened air.

9. Apparatus as described in claim 8 including two absolute filters in said other of said conduits and a radioactive particle detector adjacent one of said filters and connected to said threshold circuit.

10. Apparatus as described in claim 8 including a complete closure valve controlled by the third threshold in said one of said conduits.

11. Apparatus as described in claim 6 including a mask between said filter strip and said detector, said mask being movable parallel to said filter strip between a position completely freeing said detector for maximum analysis and a partial closure position for reduction of time of analysis.

12. Apparatus as described in claim 11, including a rack rigidly connected to said mask and means for driving said rack connected to said control circuit and controlled by the first threshold.

13. Apparatus as described in claim 11 including means for returning said mask to closed position and an aperture in said mask receiving a locking lug held by an electromagnet and released by said control circuit and controlled by the first threshold.

References Cited

UNITED STATES PATENTS

| | | |
|---|---|---|
| 3,109,096 | 10/1963 | Spaa. |
| 3,209,151 | 9/1965 | Allenden et al. |
| 3,339,070 | 8/1967 | Main. |

RALPH G. NILSON, *Primary Examiner.*

A. B. CROFT, *Assistant Examiner.*

U.S. Cl. X.R.

250—71.5, 43.5